US011845349B2

United States Patent
Lee et al.

(10) Patent No.: US 11,845,349 B2
(45) Date of Patent: Dec. 19, 2023

(54) APPARATUS AND METHOD OF CONTROLLING ON-BOARD CHARGER FOR ELECTRIC VEHICLE

(71) Applicants: Hyundai Motor Company, Seoul (KR); Kia Corporation, Seoul (KR)

(72) Inventors: Myoungseok Lee, Seoul (KR); Shinyoung Noh, Gyeonggi-do (KR); Sounghan Noh, Gyeonggi-do (KR); Na Lae Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 137 days.

(21) Appl. No.: 17/460,907

(22) Filed: Aug. 30, 2021

(65) Prior Publication Data
US 2022/0203855 A1    Jun. 30, 2022

(30) Foreign Application Priority Data
Dec. 30, 2020    (KR) .................. 10-2020-0187082

(51) Int. Cl.
*H02J 7/00*      (2006.01)
*B60L 53/30*     (2019.01)
*B60L 53/66*     (2019.01)
*B60L 53/14*     (2019.01)
*B60L 58/14*     (2019.01)

(52) U.S. Cl.
CPC ............. *B60L 53/305* (2019.02); *B60L 53/14* (2019.02); *B60L 53/66* (2019.02); *B60L 58/14* (2019.02); *B60L 2240/547* (2013.01); *B60Y 2200/91* (2013.01)

(58) Field of Classification Search
CPC ........ B60L 53/305; B60L 53/14; B60L 53/66; B60L 58/14; B60L 2240/547; B60Y 2200/91
USPC ............................................. 320/109; 701/22
See application file for complete search history.

(56) References Cited

U.S. PATENT DOCUMENTS

| 2013/0320922 | A1* | 12/2013 | Acena ................ | B60L 53/14 |
| | | | | 320/109 |
| 2015/0097526 | A1* | 4/2015 | DeDona .............. | B60L 53/16 |
| | | | | 320/109 |
| 2016/0096441 | A1* | 4/2016 | Lee .................... | B60L 53/14 |
| | | | | 320/138 |
| 2016/0297313 | A1* | 10/2016 | Ono .................... | H02J 3/322 |

FOREIGN PATENT DOCUMENTS

KR    2019-0042315 A    4/2019

* cited by examiner

*Primary Examiner* — Zixuan Zhou
(74) *Attorney, Agent, or Firm* — Fox Rothschild LLP (57) ABSTRACT

An on-board charger and a control method thereof are provided. The on-board charger includes a control pilot (CP) receiving module that detects a CP signal and a proximity detection (PD) receiving module that detects a PD signal. A processor repeatedly executes a low power run mode that supplies a voltage to the CP receiving module and the PD receiving module in a standby state for reservation charging and a completion state of reservation charging, and a low power stop mode that blocks a voltage supplied to the CP receiving module and the PD receiving module at predetermined periods.

16 Claims, 6 Drawing Sheets

APPARATUS AND METHOD OF CONTROLLING ON-BOARD CHARGER FOR ELECTRIC VEHICLE

CROSS-REFERENCE TO RELATED APPLICATION

This application claims priority to and the benefit of Korean Patent Application No. 10-2020-0187082 filed on Dec. 30, 2020, the entire contents of which are incorporated herein by reference.

BACKGROUND

(a) Field of the Disclosure

The present disclosure relates to an apparatus and method of controlling an on-board charger for an electric vehicle, and more particularly, to an apparatus and method of controlling an on-board charger for an electric vehicle that minimizes current consumption of an on-board charger in a state in which a charging stand and a charging connector of an electric vehicle are fastened and connected and the electric vehicle is started off.

(b) Description of the Related Art

Recently, global environmental contamination has increasingly become an issue, and thus use of clean energy is becoming more important recently. Particularly, air pollution in cities is becoming more severe, and exhaust gas of a vehicle is one of main causes of the air pollution. Under such circumstances, research for commercializing electric vehicles, such as a hybrid vehicle, an electric vehicle, or a fuel cell vehicle that uses electricity (that is, clean energy) as a power source, has recently been actively conducted.

The electric vehicle is supplied with electricity from an external source and then charges a battery with the supplied electricity, and utilizes a charged voltage in the battery to generate power as mechanical energy through a motor coupled to wheels. In other words, since the electric vehicle should use the charged voltage in the battery to drive the motor, a high capacity rechargeable battery is used in the electric vehicle and is provided with a battery charging apparatus for charging the high capacity rechargeable battery.

Battery charging methods may be classified into a high-speed charging method through a separate charger and a low-speed charging method through a charger installed inside of the vehicle. The high-speed charging method refers to charging of the battery for a short time while the vehicle is temporarily parked, and the low-speed charging method refers to charging of the battery to a full charging state for a long time after the vehicle is driven. For the low-speed charging method, an on-board charger (OBC) is coupled to a low-speed charging port and converts alternating current (AC) power into direct current (DC) power to charge the battery.

The on-board charger is supplied with electricity through electric vehicle supply equipment (EVSE). When an electric vehicle is charged through the EVSE, reservation charging for charging a vehicle at a time desired by a user may be performed. The reservation charging may be mainly used for charging an electric vehicle during late-night hours when electricity rates are cheap. Generally, the reservation charging includes EVSE reservation charging set by an EVSE 100 and vehicle reservation charging set by a vehicle.

When the EVSE reservation charging is performed, a control pilot (CP) signal maintains DC 9 V during a standby time, when the charging time set by the user is reached, the EVSE converts the CP signal to pulse width modulation (PWM) of 9 V, and after being ready to charge, the on-board charger starts charging. When the vehicle reservation charging is performed, the EVSE maintains a power supplying state, when the charging time set by the user is reached, the EVSE converts the CP signal to pulse width modulation (PWM) of 9 V, and after being ready to charge, the on-board charger starts charging.

As described above, since the CP signal is input to the on-board charger from the EVSE during the standby time for the reservation charging, the on-board charger must continuously detect the CP signal during the standby time. For this reason, a power source is continuously applied to the on-board charger to consume power, and a problem that the battery of the electric vehicle is extremely discharged occurs.

The above information disclosed in this section is merely for enhancement of understanding of the background of the disclosure, and therefore it may contain information that does not form the prior art that is already known in this country to a person of ordinary skill in the art.

SUMMARY

The present disclosure has been made in an effort to provide an on-board charger for an electric vehicle and a control method thereof that may minimize power consumed by the on-board charger during a standby time for reservation charging.

An embodiment of the present disclosure provides an on-board charger for an electric vehicle that may include: a control pilot (CP) receiving module configured to detect a CP signal; a proximity detection (PD) receiving module configured to detect a PD signal; and a processor configured to repeatedly execute a low power run mode that supplies a voltage to the CP receiving module and the PD receiving module in a standby state for reservation charging and a completion state of reservation charging, and a low power stop mode that blocks a voltage supplied to the CP receiving module and the PD receiving module at predetermined periods.

An execution period of the low power run mode may be set to be shorter than an execution period of the low power stop mode. An execution time of a task that takes a longest time among a plurality of tasks performed in the low power run mode may be set as the execution period of the low power run mode. The execution period of the low power stop mode may be set to be shorter than an abnormal check time required to transmit a response signal with respect to a check signal transmitted from an external controller.

When the PD signal has a predetermined voltage and the CP signal is switched from a first predetermined voltage to a second predetermined voltage, the processor may be configured to determine that the reservation charging is in a standby state. When the PD signal has a predetermined voltage and the CP signal is switched from a third predetermined voltage to a second predetermined voltage, the processor may be configured to determine that the reservation charging is completed.

Another embodiment of the present disclosure an on-board charger for an electric vehicle may include: a power source module; a first switch that selectively blocks a voltage supplied from the power source module to a peripheral module including a communication module; a second switch that selectively blocks a voltage supplied to a control pilot (CP) receiving module configured to detect a CP signal and a proximity detection (PD) receiving module detecting a DP signal; and a processor configured to repeatedly execute a low power run mode and a low power stop mode at predetermined periods through the first switch and the second switch in a standby state for reservation charging and a completion state of reservation charging. In the low power run mode, the processor may be configured to turn off the first switch to block a voltage supplied to the peripheral module, and turn on the second switch to supply a voltage to the CP receiving module and the PD receiving module to activate the CP receiving module and the PD receiving module. In the low power stop mode, the processor may be configured to turn off the first switch to block a voltage supplied to the peripheral module, and turn off the second switch to block a voltage supplied to the CP receiving module and the PD receiving module.

An execution period of the low power run mode may be set to be shorter than an execution period of the low power stop mode. An execution time of a task that takes a longest time among a plurality of tasks performed in the low power run mode may be set as the execution period of the low power run mode. When the PD signal has a predetermined voltage and the CP signal is switched from a first predetermined voltage to a second predetermined voltage, the processor may be configured to determine that the reservation charging is in a standby state. When the PD signal has a predetermined voltage and the CP signal is switched from a third predetermined voltage to a second predetermined voltage, the processor may be configured to determine that the reservation charging is completed.

Another embodiment of the present disclosure provides a control method of an on-board charger for an electric vehicle that may include: determining, by a processor, whether a standby state for reservation charging and a completion state of reservation charging through a proximity detection (PD) signal and a control pilot (CP) signal; and repeatedly executing, by the processor, a low power run mode and a low power stop mode at predetermined periods in the standby state for the reservation charging and the completion state of the reservation charging. In the low power run mode, a voltage supplied from a power source module to a peripheral module may be blocked, and a voltage may be supplied from the power source module to a CP receiving module configured to detect the CP signal and a PD receiving module configured to detect the PD signal. In the low power stop mode, a voltage supplied from the power source module to the peripheral module may be blocked, and a voltage from the power source module to the CP receiving module and the PD receiving module may be blocked.

An execution period of the low power run mode may be set to be shorter than an execution period of the low power stop mode. An execution time of a task that takes a longest time among a plurality of tasks performed in the low power run mode may be set as the execution period of the low power run mode. When the PD signal has a predetermined voltage and the CP signal is switched from a first predetermined voltage to a second predetermined voltage, the reservation charging may be determined to be in the standby state. When the PD signal has a predetermined voltage and the CP signal is switched from a third predetermined voltage to a second predetermined voltage, the reservation charging may be determined to be completed.

According to the on-board charger and the control method thereof according to the embodiment of the present disclosure as described above, since an on-board charger periodically repeats a low power run mode and a low-power stop mode in a standby state for reservation charging or in a state in which the reservation charging is completed, it is possible to minimize current consumption in the standby state for reservation charging or in the state in which the reservation charging is completed.

In addition, since the current consumption in the standby state for reservation charging or in the state in which the reservation charging is completed is minimized, a problem in which a vehicle's battery is discharged may be prevented in advance. Further, by implementing a low-power mode of the on-board charger without using a separate auxiliary processor or auxiliary power source, it is possible to reduce a manufacturing cost of the vehicle and reduce parts and a size of the on-board charger.

BRIEF DESCRIPTION OF THE DRAWINGS

These drawings are for reference only in describing embodiments of the present disclosure, and therefore, the technical idea of the present disclosure should not be limited to the accompanying drawings.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure. In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
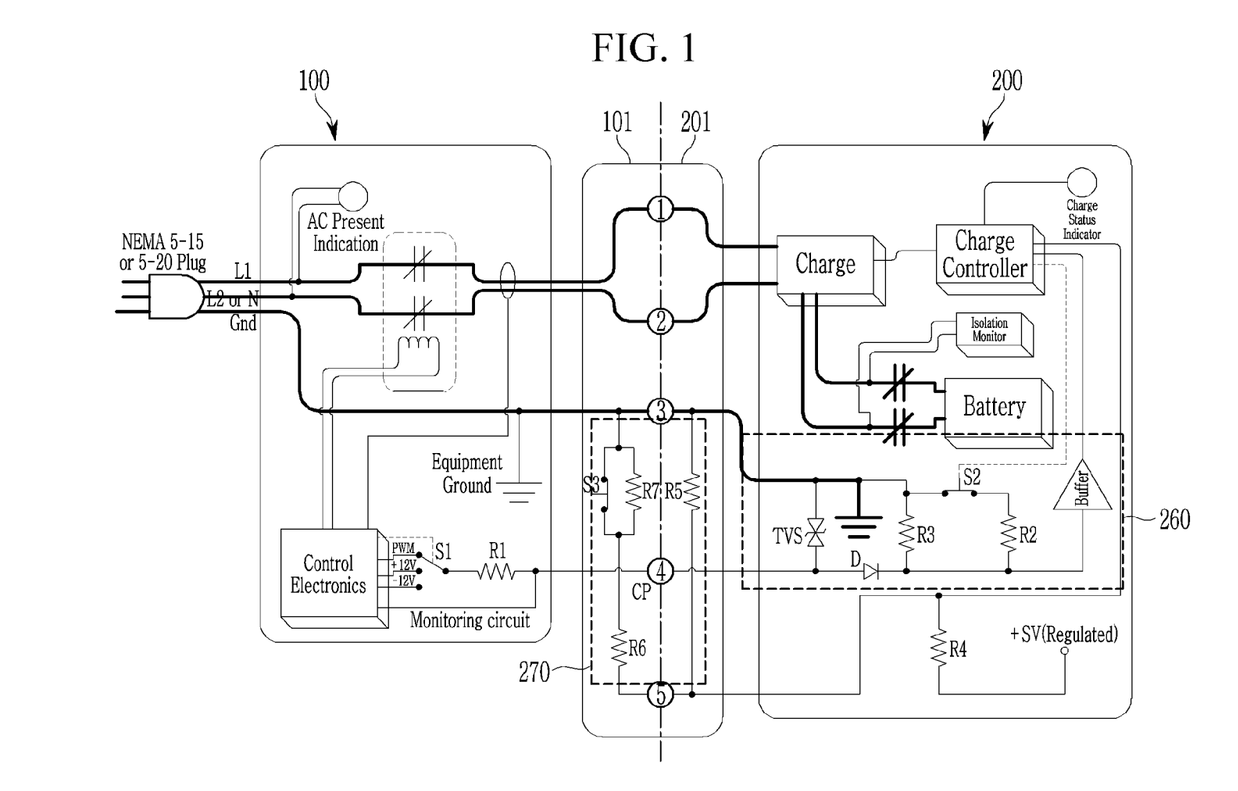
FIG. 1 illustrates a schematic view of a connection relationship between an electric vehicle and external power supply equipment according to an embodiment of the present disclosure.
Figure 2:
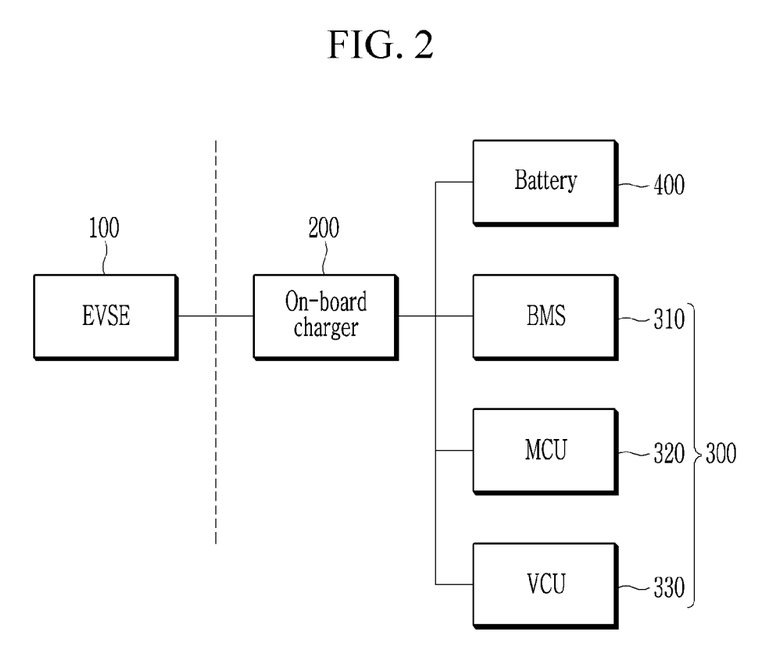
FIG. 2 illustrates a block diagram of a connection relationship between an electric vehicle and external power supply equipment according to an embodiment of the present disclosure.
Figure 3:
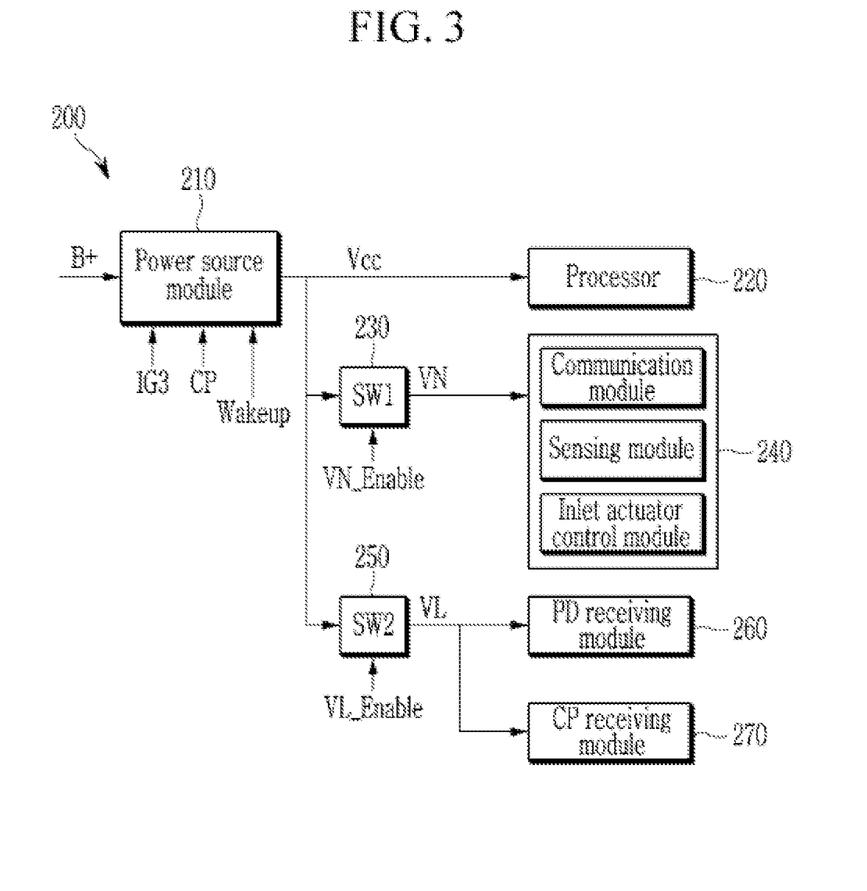
FIG. 3 illustrates a block diagram of an on-board charger according to an embodiment of the present disclosure.

Hereinafter, an on-board charger for an electric vehicle according to an embodiment of the present disclosure will be described in detail with reference to the accompanying drawings. FIG. 1 illustrates a schematic view of a connection relationship between an electric vehicle and external power supply equipment according to an embodiment of the present disclosure. FIG. 2 illustrates a block diagram of a connection relationship between an electric vehicle and external power supply equipment according to an embodiment of the present disclosure. FIG. 3 illustrates a block diagram of an on-board charger according to an embodiment of the present disclosure.

As shown in FIG. 1 and FIG. 2, an electric vehicle to which an on-board charger 200 for an electric vehicle according to an embodiment of the present disclosure is applied receives a voltage from external power supply equipment 100 and charges a high voltage battery 400 of the electric vehicle. The external power supply equipment 100 may be electric vehicle supply equipment (EVSE) provided in a home or an external charging station. The on-board charger 200 is mounted on the electric vehicle, and receives a voltage from the external power supply equipment 100 to charge the high voltage battery 400 provided in the vehicle.

When a charging connector 101 of the external power supply equipment 100 and an inlet 201 of the electric vehicle are engaged and connected, a voltage line to which a voltage is supplied, a control pilot (CP) line to which a CP signal is transmitted, and a proximity detection (PD) line to which a PD signal is transmitted are connected between the external power supply equipment 100 and the on-board charger 200. The CP signal may be transmitted from the external power supply equipment 100 to the on-board charger 200 based on a state of the electric vehicle. Based on states of the external power supply equipment 100 and the electric vehicle, the CP signal has different values. In particular, the states of the external power supply equipment 100 and the vehicle may be classified into five states of A, B1, B2, C, and E.

The A state indicates that the charging connector 101 is not engaged with the inlet 201, and in this case, the CP signal transmitted from the external power supply equipment 100 has a voltage of DC 12 V. However, from the perspective of the electric vehicle, since the charging connector 101 and the inlet 201 are not engaged, the CP signal inputted to the on-board charger 200 is 0 V.

The B1 state indicates that the charging connector 101 is engaged with the inlet 201, but the external power supply equipment 100 is in a ready state in which no voltage is supplied. In particular, the CP signal has a voltage of DC 9 V.

The B2 state indicates a state in which the external power supply equipment 100 is ready to supply a voltage while the charging connector 101 is engaged with the inlet 201. In particular, the external power supply equipment 100 outputs a PWM (pulse width modulation) CP signal of 9 V. Accordingly, the on-board charger 200 of the vehicle may detect that the external power supply equipment 100 is ready for charging.

The C state indicates a state in which the on-board charger 200 starts charging the high voltage battery 400, and in this case, the CP signal has a PWM signal of 6 V.

The E state indicates a state in which the external power supply equipment 100 does not generate a CP signal, or a state in which a CP signal is generated but not transmitted to the on-board charger 200.

Table 1 summarizes the CP signals according to the states of the external power supply equipment 100 and the vehicle.

TABLE 1

| State | EVSE | Vehicle | Remarks |
| --- | --- | --- | --- |
| A state | 12.0 V | 0 V | DC |
| B1 state | 9.0 | 9.0 | DC |
| B2 state | 9.0 | 9.0 | PWM |
| C state | 6.0 | 6.0 | PWM |
| E state | 0 | 0 | DC |

The PD signal provides information that may detect whether the charging connector 101 of the external power supply equipment 100 and the inlet 201 of the electric vehicle are engaged. A level of the PD signal is changed according to the engaged state between the charging connector 101 and the inlet 201. For example, when the charging connector 101 and the inlet 201 are not engaged, the PD signal has a nominal voltage of 4.46 V. When the charging connector 101 and the inlet 201 are engaged and a latch is released, the PD signal has a nominal voltage of 1.53 V. When the charging connector 101 and the inlet 201 are engaged and the latch is engaged, the PD signal has a nominal voltage of 2.7 V.

The on-board charger 200 may be configured to determine a reservation charging condition and/or a charging completion condition from the external power supply equipment 100 based on the CP signal and the PD signal, and execute the low-power mode in the charging standby state and charging completion state for the reservation charging. Accordingly, referring to FIG. 3, the on-board charger 200 may include a power source module 210, a first switch 230, a second switch 250, a CP receiving module 260, a PD receiving module 270, a communication module, and a processor 220.

The power source module 210 may be configured to receive a constant voltage (B+) from the battery 400 of the vehicle to supply a first voltage (Vcc) to the processor 220; supply a second voltage (VN) to a peripheral module 240 including a communication module, a sensing module, and an inlet actuator control module according to on/off of the first switch 230; and supply a third voltage (VL) to the CP receiving module 260 and the PD receiving module 270 according to on/off of the second switch 250. In other words, the first switch 230 may be configured to receive selectively block the voltage supplied from the power source module 210 to the peripheral module 240 including the communication module, and the second switch 250 may be configured to receive selectively block the voltage supplied from the power source module 210 to the CP receiving module 260 and the PD receiving module 270.

The communication module may include a car area network (CAN) communication module for CAN communication between the on-board charger 200 and an external controller 300. The sensing module may include an inlet 201 temperature sensing module configured to sense a temperature of the inlet 201. In addition, an inlet 201 actuator control module may be configured to operate a locking device that locks the inlet 201 and the charging connector 101 to prevent the inlet 201 and the charging connector 101 from being disengaged while the inlet 201 and the charging connector 101 are engaged.

The CP receiving module 260 may be configured to detect a CP signal transmitted from the external power supply equipment 100, and transmit the received CP signal to the processor 220. In addition, the PD receiving module 270 may be configured to detect the engaged state of the connector of the external power supply equipment 100 and the inlet 201 of the vehicle, and the detected PD signal may be transmitted to the processor 220.

When a voltage is supplied from the battery 400 and the power module 210 is turned on, the first voltage (Vcc) may be continuously supplied from the power source module 210 to the processor 220. The processor 220 may be configured to determine the standby state for reservation charging of the vehicle or the completion state of the reservation charging based on the CP signal and the PD signal, and perform the low-power mode in the standby state for reservation charging or the completion of the reservation charging. Accordingly, the processor 220 may be provided as at least one processor 220 executed by a predetermined program, and the predetermined program is configured to perform respective steps of a control method of the on-board charger 200 for the electric vehicle according to the embodiment of the present disclosure.

When the on-board charger 200 normally operates, the first switch 230 is turned on by an activation signal (VN_enable) of the processor 220, and when the first switch 230 is turned on, the second voltage (VN) is supplied to the communication module, the sensing module, and the inlet 201 actuator control module. When the on-board charger 200 operates in low power mode, the second switch 250 is turned on by an activation signal (VL_enable) of a microprocessor, and when the second switch 250 is turned on, the third voltage (VL) is supplied to the third voltage to the CP receiving module 260 and the PD receiving module 270. When a user executes the reservation charging, the on-board charger 200 may be configured to operate in low power mode to minimize the power consumed during the standby time for the reservation charging.

The low power mode may include a low power run mode and a low power stop mode, and during the standby time for the reservation charging, the processor 220 may be configured to periodically repeat the low power run mode and the low power stop mode. In other words, in the specification of the present disclosure, the mode in which the low power run mode and the low power stop mode are periodically repeatedly executed is referred to as a low power mode. The processor 220 may be configured to determine the reservation charging state, the standby state for reservation charging, and the state in which the reservation charging is completed from the CP signal and the PD signal. For example, when the PD signal has a predetermined voltage (for example, 2.7 V), the processor 220 may be configured to determine that the charging connector 101 and the inlet 201 are engaged.

Figure 4:
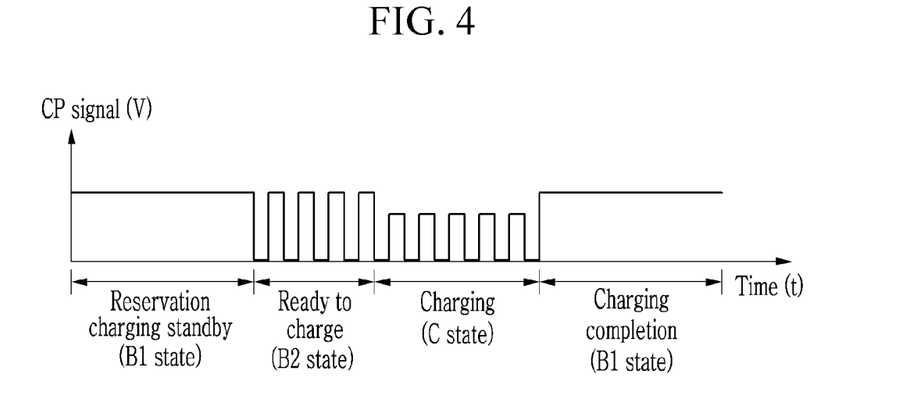
FIG. 4 illustrates a graph of a CP signal according to an embodiment of the present disclosure.

Referring to FIG. 4, the processor 220 may be configured to determine that the reservation charging is in the standby state when the CP signal is switched from the A state to the B1 state described above for DC 9 V to be output from the external power supply equipment 100. In other words, when the PD signal has a predetermined voltage, the CP signal is switched from DC 0 V to DC 9 V, and DC 9 V is output, the processor 220 may be configured to determine that the reservation charging is in the standby state.

When the CP signal is switched from the B1 state to the B2 state and PWM 9 V is output from the external power supply equipment 100, the processor 220 may be configured to determine that the external power supply equipment 100 is ready to supply a voltage. In addition, when the on-board charger 200 is ready to receive a voltage from the external power supply equipment 100, the processor 220 of the on-board charger 200 may be configured to transmit a response signal to the external power supply equipment 100, and in response, the external power supply equipment 100 may be configured to transmit the CP signal of PWM 6 V to be switched from the B2 state to the C state. Accordingly, a voltage is supplied from the external power supply equipment 100 to the vehicle to start charging the battery 400 of the vehicle.

As described above, when the PD signal has a predetermined voltage and the CP signal is switched from the A state (0 V, first predetermined voltage) to the B1 state (DC 9 V, second predetermined voltage), the processor 220 may be configured to determine that the reservation charging is in the standby state. In addition, when the PD signal has a predetermined voltage and the CP signal maintains the B2 state (PWM 9 V), the processor 220 may be configured to determine that the standby state is terminated and to be the charging ready state. In addition, when the PD signal has a predetermined voltage and the CP signal maintains the C state (PWM 6 V), the processor 220 may be configured to determine that charging has started.

In addition, when the battery 400 is fully charged, the CP signal is switched from the C state (PWM 6 V, third predetermined voltage) to the B1 state (DC 9 V, second predetermined voltage). Through this, the processor 220 may be configured to determine the completion state of the reservation charging. In other words, when the PD signal has a predetermined voltage, the CP signal is switched from PWM 6 V to DC 9 V, and DC 9 V is output, the processor 220 may be configured to determine that the reservation charging is completed.

In the low power run mode, the processor 220 may be configured to continuously detect the CP signal through the CP receiving module 260, and continuously detect the PD signal through the PD receiving module 270. In other words, the processor 220 may be configured to turn on the second switch 250, and supply the third voltage (VL) from the power source module 210 to the CP receiving module 260 and the PD receiving module 270 through the second switch 250 to activate the CP receiving module 260 and the PD receiving module 270. In the low power run mode, the microprocessor of the on-board charger 200 may be configured to execute a first task of detecting the CP signal, a second task of detecting the PD signal, a third task of detecting an IG3 signal that provides a state in which the electric vehicle is started on or off, and a fourth task of detecting a wake-up signal that provides a state in which a door of the vehicle is locked or unlocked by a user.

In particular, a time required for the first task of detecting the CP signal is a sum of a time when the third voltage is applied to the CP receiving module 260 and the CP receiving module 260 is activated and a rising time of the CP signal; a time required for the second task of detecting the PD signal is a sum of a time when the third voltage is applied to the PD receiving module 270 and the PD receiving module 270 is activated and a rising time of the PD signal; a time required for the third task of detecting the IG3 signal is a rising time of the IG3 signal; and a time required for the fourth task of detecting the wakeup signal is a rising time of the wakeup signal.

In particular, an execution time of a task that takes a longest time among the first task to the fourth task may be set as an execution period of the low power run mode. In other words, an execution time of a task that takes the longest time among a plurality of tasks performed in the low power run mode may be set as an execution period of the low power run mode.

When the IG3 signal or wake-up signal is input in the low power run mode, the microprocessor 220 of the on-board charger 200 may be configured to execute a normal run mode for checking whether conditions for charging the battery 400 are met through CAN communication with the external controllers 300 involved in charging the battery 400. Particularly, the external controller 300 may include a battery management system (BMS) 310, a motor control unit (MCU) 320, and a vehicle control unit (VCU) 330. When the condition for charging the battery 400 is satisfied through communication with the external controller 300 in the normal run mode, the processor 220 may be configured to transmit a response signal to the external power supply equipment 100, and the external power supply equipment 100 is switched to the C state by transmitting the CP signal of PWM 6 V.

In the low power stop mode, all functions except a clock (CLK) of the processor 220 are disabled, and the processor 220 does not detect the CP signal and the PD signal. In other words, the processor 220 turns off the second switch 250, so that the third voltage (VL) is not supplied from the power source module 210 to the CP receiving module 260 and the PD receiving module 270 through the second switch 250. In addition, the first switch 230 is also turned off, so that the second voltage (VN) is not supplied to the communication module, the sensing module, and the like.

When the IG3 signal or the wake-up signal is inputted while the low power mode is running, the processor 220 is switched to the normal run mode. In particular, the processor 220 may be configured to perform CAN communication with the external controllers 300. The external controller 300 may be configured to transmit a check signal to check whether the on-board charger 200 is abnormal. When the on-board charger 200 does not transmit a response signal for a predetermined time (for example, 500 ms), the external controller 300 may be configured to determine that the on-board charger 200 is abnormal. Particularly, a maximum time for the external controller 300 to transmit the check signal to the on-board charger 200 and then for the on-board charger 200 to transmit the response signal to the external controller 300 is referred to as an abnormal check time.

However, when the IG3 signal or the wakeup signal is inputted while the low power stop mode is running, the first switch 230 is turned off in the low power stop mode and the communication module is not activated, so a response signal may be transmitted to the external controller 300. In other words, when the execution period of the low power stop mode is longer than the abnormal check time, the on-board charger 200 may not detect the IG3 signal or the wakeup signal. Therefore, the execution period of the low power stop mode may be set shorter than the abnormal check time.

Figure 5:
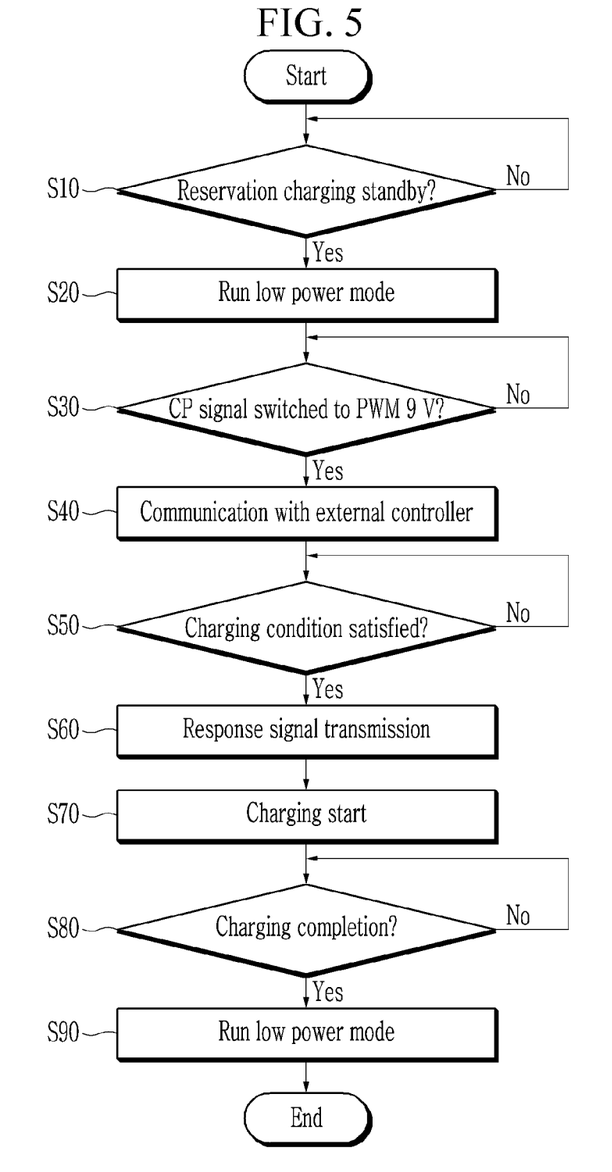
FIG. 5 illustrates a flowchart of a control method of an on-board charger for an electric vehicle according to an embodiment of the present disclosure.

Hereinafter, a control method of the on-board charger 200 for the electric vehicle according to the embodiment of the present disclosure as described above will be described in detail with reference to the accompanying drawings. FIG. 5 illustrates a flowchart of a control method of the on-board charger 200 for the electric vehicle according to the embodiment of the present disclosure.

As shown in FIG. 5, when the power source (Vcc) is supplied to the power source module 210 of the on-board charger 200 according to the embodiment of the present disclosure, the processor 220 may be configured to determine whether the vehicle is in the standby state for reservation charging or the completion state of the reservation charging through the PD signal and the CP signal (S10). In response to determining that the vehicle is in the standby state for reservation charging or the completion state of the reservation charging, the processor 220 of the on-board charger 200 may be configured to execute the low power mode (S20). In the low power mode, the low power run mode and the low power stop mode are repeatedly executed.

As described above, while the low power run mode is being performed, the first switch 230 is turned off and the second switch 250 is turned on to detect the CP signal and the PD signal, so that the voltage (VL) is supplied to the CP receiving module 260 and the PD receiving module 270. In addition, while the low power stop mode is being performed, both the first switch 230 and the second switch 250 are turned off. Since a voltage is supplied only to the processor 220, the CP receiving module 260, and the PD receiving module 270 in the low power run mode, current consumption in the low power mode may be minimized compared with a prior art.

In addition, in the low power stop mode, most functions except for the clock of the processor 220 are disabled, and the first switch 230 is turned off, so that the voltage (VN) supplied to the peripheral module 240 including the communication module is blocked, and the second switch 250 is turned off, so that the voltage (VL) supplied to the CP receiving module 260 and the PD receiving module 270 is blocked. In other words, since the voltage supplied to most modules of the on-board charger 200 is blocked while the low power stop mode is being performed, when the vehicle is in the standby state for reservation charging or when the reservation charging is completed, it is desirable that the execution period of the low power stop mode be set as long as possible.

Figure 6:
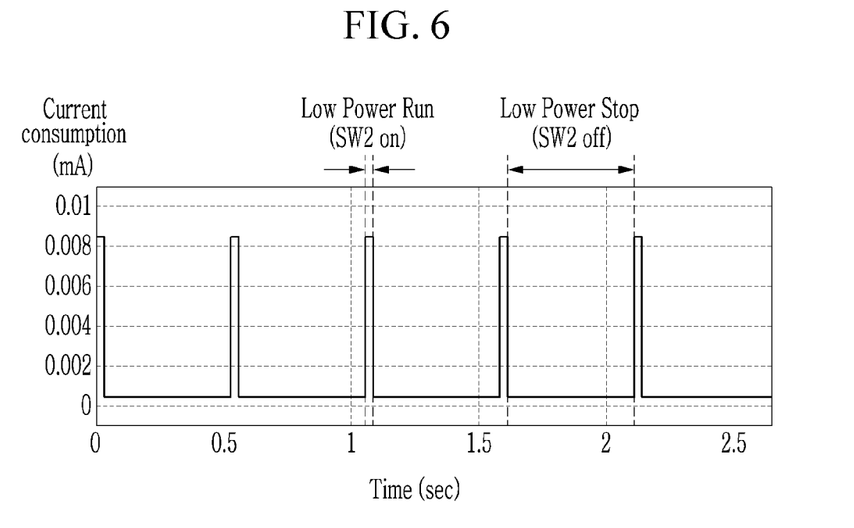
FIG. 6 illustrates a graph of a consumption current in a low power mode according to an embodiment of the present disclosure.

In the embodiment of the present disclosure, the execution period of the low power run mode is set shorter than the execution period of the low power stop mode. Referring to FIG. 6, in the embodiment of the present disclosure, the execution period of the low power stop mode may be set to be shorter (for example, about 450 ms) than 500 ms. The execution period of the low power run mode may be set equal to an execution time of a task that takes the longest time among a plurality of tasks performed in the low power run mode. For example, the execution period of the low power run mode may be set equal to an execution time (for example, 50 ms) of the task for detecting the CP signal.

When the CP signal is switched to PWM 9 V while the low power mode is running (S30), the processor 220 may be configured to determine that the standby time for reservation charging is terminated and a voltage may be supplied from the external power supply equipment 100, and then communicate with the external controller 300 through the communication module (S40). When the charging condition for charging the battery 400 is satisfied through communication with the external controller 300 (S50), the processor 220 may be configured to transmit a response signal to the external power supply equipment 100 (S60), and the external power supply equipment 100 may be configured to transmit the CP signal of PWM 6 V in response to the response signal to start charging the battery 400 (S70).

When the battery 400 is fully charged, the CP signal is switched from PWM 6 V (C state) to DC 9 V (B1 state), and the processor 220 may be configured to determine that the reservation charging is completed (S80). In particular, as in the standby state of the reservation charging described above, the processor 220 may be configured to perform the low power mode (S90).

As described above, according to the on-board charger for the electric vehicle and the control method thereof according to the embodiment of the present disclosure as described above, since an on-board charger periodically repeats a low power run mode and a low-power stop mode in a standby state for reservation charging or in a state in which the reservation charging is completed, it is possible to minimize current consumption in the standby state for reservation charging or in the state in which the reservation charging is completed.

In addition, since the current consumption in the standby state for reservation charging or in the state in which the reservation charging is completed is minimized, a problem in which a vehicle's battery is discharged may be prevented in advance. Further, by implementing a low-power mode of the on-board charger without using a separate auxiliary processor or auxiliary power source, it is possible to reduce a manufacturing cost of the vehicle and reduce parts and a size of the on-board charger.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: external power supply equipment
101: charging connector
200: on-board charger
201: inlet
210: power source module
220: processor
230: first switch
240: peripheral module
250: second switch
260: CP receiving module
270: PD receiving module
300: external controller
310: BMS
320: MCU
330: VCU
400: battery

What is claimed is:

1. An on-board charger for an electric vehicle, comprising:
   a control pilot (CP) receiving module configured to detect a CP signal;
   a proximity detection (PD) receiving module configured to detect a PD signal; and
   a processor configured to repeatedly execute a low power run mode that supplies a voltage to the CP receiving module and the PD receiving module in a standby state for reservation charging and a completion state of reservation charging, and a low power stop mode that blocks a voltage supplied to the CP receiving module and the PD receiving module at predetermined periods;
   wherein, in the standby state for reservation charging and the completion of reservation charging, a voltage for reservation charging of a battery of the electric vehicle is not supplied by an external power supply equipment.

2. The on-board charger for the electric vehicle of claim 1, wherein an execution period of the low power run mode is set to be shorter than an execution period of the low power stop mode.

3. The on-board charger for the electric vehicle of claim 1, wherein an execution time of a task that takes a longest time among a plurality of tasks performed in the low power run mode is set as the execution period of the low power run mode.

4. The on-board charger for the electric vehicle of claim 1, wherein the execution period of the low power stop mode is set to be shorter than an abnormal check time required to transmit a response signal with respect to a check signal transmitted from an external controller.

5. The on-board charger for the electric vehicle of claim 1, wherein when the PD signal has a predetermined voltage and the CP signal is switched from a first predetermined voltage to a second predetermined voltage, the processor is configured to determine that the reservation charging is in a standby state.

6. The on-board charger for the electric vehicle of claim 1, wherein when the PD signal has a predetermined voltage and the CP signal is switched from a third predetermined voltage to a second predetermined voltage, the processor is configured to determine that the reservation charging is completed.

7. An on-board charger for an electric vehicle, comprising:
- a power source module;
- a first switch that selectively blocks a voltage supplied from the power source module to a peripheral module including a communication module;
- a second switch that selectively blocks a voltage supplied to a control pilot (CP) receiving module configured to detect a CP signal and a proximity detection (PD) receiving module configured to detect a DP signal; and
- a processor configured to repeatedly execute a low power run mode and a low power stop mode at predetermined periods through the first switch and the second switch in a standby state for reservation charging and a completion state of reservation charging,
- wherein in the low power run mode, the processor is configured to turn off the first switch to block a voltage supplied to the peripheral module, and turn on the second switch to supply a voltage to the CP receiving module and the PD receiving module to activate the CP receiving module and the PD receiving module, and
- in the low power stop mode, the processor is configured to turn off the first switch to block a voltage supplied to the peripheral module, and turn off the second switch to block a voltage supplied to the CP receiving module and the PD receiving module.

8. The on-board charger for the electric vehicle of claim 7, wherein an execution period of the low power run mode is set to be shorter than an execution period of the low power stop mode.

9. The on-board charger for the electric vehicle of claim 7, wherein an execution time of a task that takes a longest time among a plurality of tasks performed in the low power run mode is set as the execution period of the low power run mode.

10. The on-board charger for the electric vehicle of claim 7, wherein when the PD signal has a predetermined voltage and the CP signal is switched from a first predetermined voltage to a second predetermined voltage, the processor is configured to determine that the reservation charging is in a standby state.

11. The on-board charger for the electric vehicle of claim 7, wherein when the PD signal has a predetermined voltage and the CP signal is switched from a third predetermined voltage to a second predetermined voltage, the processor is configured to determine that the reservation charging is completed.

12. A control method of an on-board charger for an electric vehicle, comprising:
- determining, by a processor, whether a standby state for reservation charging and a completion state of reservation charging through a proximity detection (PD) signal and a control pilot (CP) signal; and
- repeatedly executing, by the processor, a low power run mode and a low power stop mode at predetermined periods in the standby state for the reservation charging and the completion state of the reservation charging,
- wherein in the low power run mode, a voltage supplied from a power source module to a peripheral module is blocked, and a voltage is supplied from the power source module to a CP receiving module configured to detect the CP signal and a PD receiving module configured to detect the PD signal, and
- in the low power stop mode, a voltage supplied from the power source module to the peripheral module is blocked, and a voltage from the power source module to the CP receiving module and the PD receiving module is blocked.

13. The control method of the on-board charger for the electric vehicle of claim 12, wherein an execution period of the low power run mode is set to be shorter than an execution period of the low power stop mode.

14. The control method of the on-board charger for the electric vehicle of claim 12, wherein an execution time of a task that takes a longest time among a plurality of tasks performed in the low power run mode is set as the execution period of the low power run mode.

15. The control method of the on-board charger for the electric vehicle of claim 12, wherein when the PD signal has a predetermined voltage and the CP signal is switched from a first predetermined voltage to a second predetermined voltage, the reservation charging is determined to be in the standby state.

16. The control method of the on-board charger for the electric vehicle of claim 12, wherein when the PD signal has a predetermined voltage and the CP signal is switched from a third predetermined voltage to a second predetermined voltage, the reservation charging is determined to be completed.

* * * * *